(12) United States Patent
Dec et al.

(10) Patent No.: US 9,137,117 B2
(45) Date of Patent: Sep. 15, 2015

(54) SYSTEM AND METHOD FOR CONFIGURATION OF FIXED PORT LOCATION IN A NETWORK ENVIRONMENT

(75) Inventors: Wojciech Dec, Amsterdam (NL); Richard Pruss, Queensland (AU)

(73) Assignee: CISCO TECHNOLOGY, INC., San Jose, CA (US)

( * ) Notice: Subject to any disclaimer, the term of this patent is extended or adjusted under 35 U.S.C. 154(b) by 151 days.

(21) Appl. No.: 13/595,267

(22) Filed: Aug. 27, 2012

(65) Prior Publication Data

US 2014/0057666 A1      Feb. 27, 2014

(51) Int. Cl.
*H04W 24/00* (2009.01)
*H04L 12/24* (2006.01)
*H04W 64/00* (2009.01)
*H04W 4/02* (2009.01)
*H04W 88/08* (2009.01)
*H04W 84/12* (2009.01)

(52) U.S. Cl.
CPC ............... *H04L 41/12* (2013.01); *H04W 4/02* (2013.01); *H04W 64/00* (2013.01); *H04W 84/12* (2013.01); *H04W 88/08* (2013.01)

(58) Field of Classification Search
CPC ....... H04W 24/02; H04W 4/02; H04W 84/12; H04W 88/08; H04W 12/06; H04W 64/00; H04W 63/0823
USPC ............... 340/8.1, 539.13, 9.1; 709/220–229; 455/404.2, 456.1
See application file for complete search history.

(56) References Cited

U.S. PATENT DOCUMENTS

| | | | |
|---|---|---|---|
| 4,864,492 A | 9/1989 | Blakely-Fogel et al. | |
| 6,098,098 A | 8/2000 | Sandahl et al. | |
| 6,195,531 B1 | 2/2001 | Aguirre et al. | |
| 6,772,204 B1 | 8/2004 | Hansen | |
| 7,031,263 B1 * | 4/2006 | Sun et al. | 370/252 |
| 8,140,094 B2 | 3/2012 | Morgan et al. | |
| 8,244,272 B2 | 8/2012 | Morgan et al. | |
| 2001/0044840 A1 * | 11/2001 | Carleton | 709/223 |
| 2003/0226017 A1 * | 12/2003 | Palekar et al. | 713/168 |
| 2006/0019679 A1 * | 1/2006 | Rappaport et al. | 455/456.5 |
| 2007/0038866 A1 * | 2/2007 | Bardsley et al. | 713/182 |
| 2008/0080415 A1 * | 4/2008 | Stephenson et al. | 370/328 |
| 2008/0155094 A1 * | 6/2008 | Roese et al. | 709/224 |
| 2010/0026569 A1 | 2/2010 | Amidi | |
| 2010/0056124 A1 * | 3/2010 | Keating et al. | 455/418 |
| 2011/0314515 A1 * | 12/2011 | Hernoud et al. | 726/2 |
| 2013/0198817 A1 * | 8/2013 | Haddad et al. | 726/5 |

\* cited by examiner

*Primary Examiner* — Benjamin C Lee
*Assistant Examiner* — Chico A Foxx
(74) *Attorney, Agent, or Firm* — Patent Capital Group

(57) ABSTRACT

A method is provided in one example embodiment and includes determining a location of a location detection device using a wireless link; determining an identity of a fixed port to which the location detection device is connected, where the location of the location detection device is proximate to the fixed port; and communicating a location of the fixed port to a location anchor. In more specific examples, the location of the fixed port is linked to a point of attachment in order to configure the fixed port. Additionally, the location of the fixed port can be presented to a server for application to a point of attachment via an application program interface (API).

20 Claims, 3 Drawing Sheets

SYSTEM AND METHOD FOR CONFIGURATION OF FIXED PORT LOCATION IN A NETWORK ENVIRONMENT

TECHNICAL FIELD

This disclosure relates in general to the field of communications and, more particularly, to a system and a method for configuration of fixed port location in a network environment

BACKGROUND

Networking architectures have grown increasingly complex in communication environments. As the number of end users increases, proper routing and efficient management of sessions and data flows becomes critical. The routing and management of sessions and data flows often requires multiple pieces of computer hardware (e.g., server, router, switches, storage, etc.). The computer hardware is typically stored in a server rack or a tower server. The rack contains multiple mounting slots called bays: each designed to hold a hardware unit secured in place with screws. Each piece of hardware should be connected to another piece of hardware, which is typically done with high-speed cables. For systems with multiple pieces of hardware, tracing cables through the cable system can be time-consuming and costly, especially so when dealing with building or campus-wide cabling systems.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes determining a location of a location detection device using a wireless link. The wireless link in this context can include any suitable protocol (e.g., 802.11, WiFi, wireless local area network (WLAN) access point protocols, femto and pico cell protocols, global positioning system (GPS) protocols, etc.). The method can also include determining an identity of a fixed port to which the location detection device is connected. The identity can include any suitable information that would identify the fixed port. The location of the location detection device is proximate to the fixed port (e.g., close to the fixed port, in the same general area (or same room) as the fixed port, near the fixed port, suitably associated to the fixed port, sharing certain components with the fixed port, etc.). The method also includes communicating a location of the fixed port to a location anchor. In more specific examples, the location of the fixed port is linked to a point of attachment in order to configure the fixed port. Additionally, the location of the fixed port can be presented to a server for application to a point of attachment via an application program interface (API).

In yet other example methodologies, the method can include sending data associated with the location of the fixed port to a server or a switch for subsequent storage in a database. The determining of the identity of the fixed port can be based on a plurality of dynamic host configuration protocol (DHCP) messages in certain example implementations. Additionally, the determining of the identity of the fixed port can be based on information provided by the location anchor that is proximate to the fixed port. In addition, the location of the location detection device can be determined using a Wi-Fi protocol, or determined using a global positioning system protocol.

In more detailed instances, the method can include inserting an Ethernet port (e.g., a dongle) into the fixed port to establish a connection between the location detection device and the location anchor. Additionally, the method can include identifying user equipment that is associated with the fixed port. In certain examples, the method can include displaying a plurality of locations associated with a plurality of fixed ports; and modifying configuration data associated with the plurality of locations for the fixed ports.

EXAMPLE EMBODIMENTS

Figure 1:
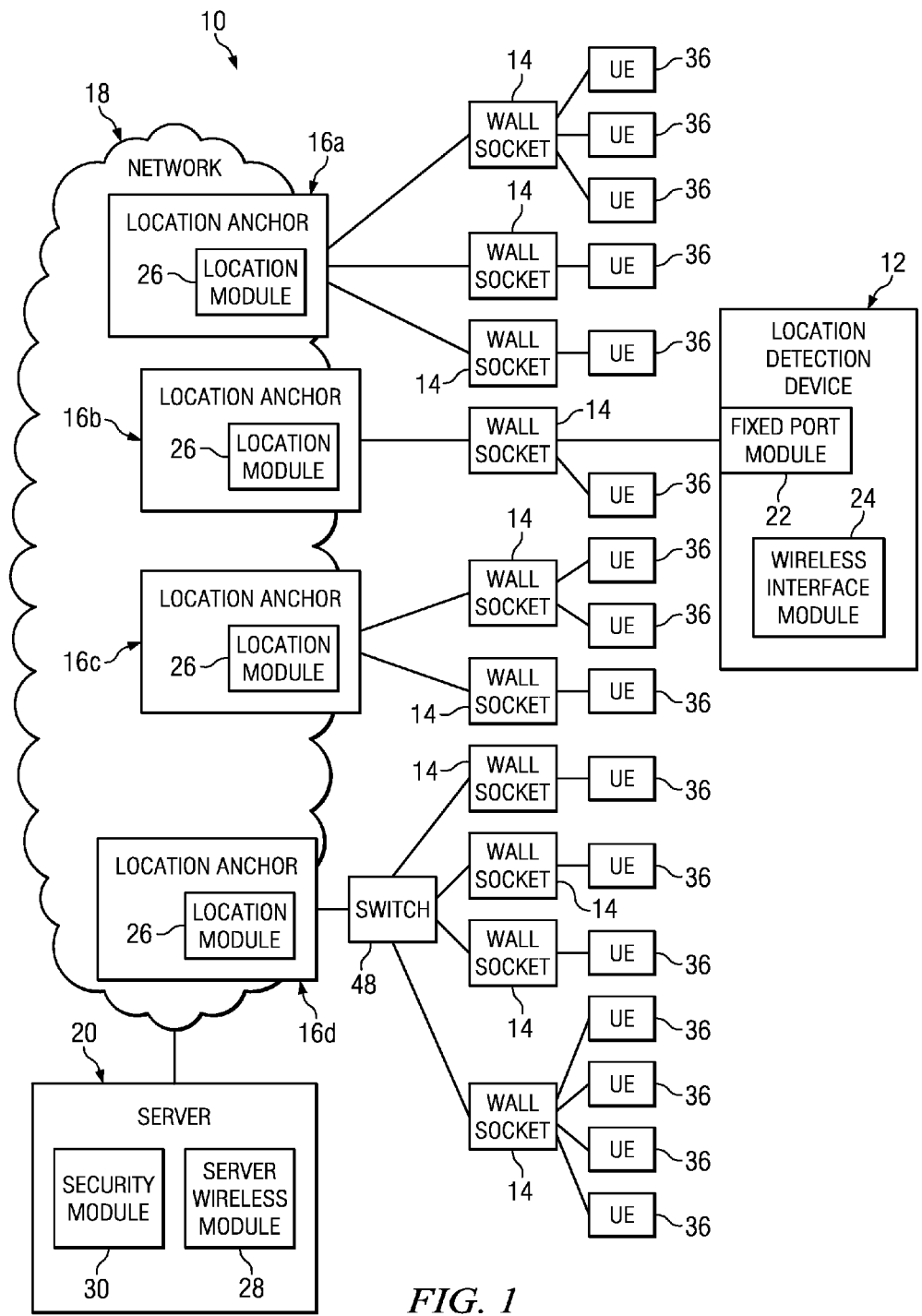
FIG. 1 is a simplified block diagram of a communication system to configure fixed port locations in accordance with one embodiment of the present disclosure.

Turning to FIG. 1, FIG. 1 is a simplified block diagram of a communication system 10 for configuration of fixed port locations in accordance with one embodiment of the present disclosure. Communication system 10 includes a location detection device 12, a plurality of wall sockets 14, a plurality of location anchors 16a-d, a network 18, a server 20, a plurality of user equipment (UE) 36, and a switch 48. Location detection device 12 contains a fixed port module 22 and a wireless interface module 24. Location anchors 16a-d each contain a location module 26. Server 20 contains server wireless module 28 and security module 30.

In an embodiment, a location device (e.g., location detection device 12) is used to determine fixed port locations (e.g., wall sockets 14) for each port (e.g., location anchor 16a-d) in an area. In an example implementation, an enterprise network operator can deploy a fixed or temporary Wi-Fi network location system (e.g., as part of a turnkey service) that is capable of locating wireless clients. The location device can be equipped with a Wi-Fi client and an Ethernet port (e.g., dongle) to connect to each socket (e.g., Ethernet socket) in a target area. In an embodiment, the location device can also feature a global positioning system (GPS) receiver, which when coupled with an indoor GPS transceiver installation in the target area, could substitute or supplement the Wi-Fi location method. In another embodiment, the location device may use only the GPS receiver and not use (or be equipped with) the Wi-Fi client. When the location device is connected to a fixed port (e.g., an Ethernet access port), the location device can retrieve location information from the Wi-Fi location system, a GPS transceiver, and/or a global system for mobile communications (GSM)/cellular network system.

The identity of the fixed port that the location device is connected to can be determined through received messages (e.g., Cisco Discovery Protocol (CDP) messages, Dynamic Host Configuration Protocol (DHCP), etc.), directly by the point of attachment if a server is embedded in the access device for the port, or by reference to remote-identification information derived from DHCP address assignment to the location device. For example, a location anchor (e.g., location anchor 16b) may be wired directly to a fixed port location (e.g., wall socket 14). When the location device is connected to the fixed port, the location of the port can be communicated unambiguously to the location anchor. The use of DHCP or CDP may not be necessary. In another example, the location anchor may be wired indirectly with the fixed port location (i.e., switch 48 may be provided between location anchor 16b and wall socket 14 and switch 48 may be a "dumb" switch). In this example, when the location device is connected to the fixed port, the metered location of the port can be communicated and the location anchor can glean information from supplementary protocols such as DHCP or CDP to determine the identity of the physical port on the "dumb" switch that is wired to the fixed port that the location device is connected. Once the identity of the point of attachment is determined, the location device communicates with the server regarding the derived location.

The derived location can be stored in a database on the server and/or on a switch that is serving the fixed port. The derived location is linked to the point of attachment, thereby configuring the fixed port location. Communication system 10 can allow for provisioning information about cable endpoints to switches in a structured cable system from the endpoints by determining the location information using one system (e.g., Wi-Fi or GPS), and by using the location information to set the location on another system (e.g., cabled port).

For purposes of illustrating certain example techniques of communication system 10, it is important to understand the communications that may be traversing the network. The following foundational information may be viewed as a basis from which the present disclosure may be properly explained. Network device location technology relies on the ability to locate a connected device based on known reference points within the network, which may be termed as "location anchors." Location anchors can include any suitable network device, component, network element, etc. For example, in the context of in-building Ethernet networks, each Ethernet port can constitute such a location anchor, indicating the location of an Ethernet wall socket. This effectively allows the location of the device connected to the socket to be determined.

One problem in using location anchors as a known reference point is the so-called Day 1 problem. The Day 1 problem includes the need for an operator to statically configure location information on every socket location at the end of the wire (or fiber) for every Ethernet switch port. For mid-to-large enterprises, with thousands of ports or wall sockets, the process can result in significant labor cost and a non-trivial process to survey existing jacks, map their location in the building, and configure the switch ports.

The traditional method for solving this problem requires the tracing of each physical socket and associated cabling to the switch port for the physical socket. Once the physical socket is located, the access device should be manually configured by skilled personnel to show the fixed port location. In addition, the process does not allow for an end-device that has already acquired location information from one interface to use that location information to configure the fixed port location.

In accordance with one example implementation of the present disclosure, communication system 10 can resolve the aforementioned issues (and potentially others) associated with the configuration of fixed port locations. In an example implementation, an enterprise network operator can deploy a fixed or temporary Wi-Fi network location solution (e.g., as part of a turnkey service) that is capable of locating wireless clients. More specifically, a location device (e.g., an Android phone, iPhone, laptop computer, etc.) is equipped with a Wi-Fi client and an Ethernet port (dongle) to connect to each Ethernet socket in a target area. The location device retrieves its Wi-Fi location information via existing compatible extensions (e.g., Cisco compatible extensions (CCX)) from the Wi-Fi location system. In another example, the location device can also feature a GPS receiver, which when coupled with a more elaborate indoor GPS transceiver installation in the target area, could substitute or supplement the Wi-Fi location method. In other implementations, different types of location devices and methods may equally be used.

When the location device is connected to an active access port (e.g., Ethernet access port), the device may be configured to negotiate a secure/authenticated communication channel with a server, which could be embedded in the Ethernet access device. The location device's point of attachment (i.e., port) in the network can be determined either by means of received messages, directly by the point of attachment of an access device (e.g., if the server is embedded in the Ethernet access device), or by reference to remote-identification information derived from DHCP address assignment to the location device. Following the above, the location device presents to the server the Wi-Fi or GPS derived location that is applied to the point of attachment (e.g., of the location device, the access device, etc.) via the API.

The Wi-Fi Alliance defines Wi-Fi as any wireless local area network (WLAN) product that is based on the Institute of Electrical and Electronics Engineers' (IEEE) 802.11 standards. Using Wi-Fi, 802.11 devices can be triangulated in a manner similar to GPS. However, signal attenuation due to distance is indistinguishable from signal attenuation due to physical barriers so an awareness of the physical location and the location and type of walls or other physical barriers in the area may be necessary.

802.11 tracking uses one of two methods: Time Difference on Arrival (TDA), and Received Signal Strength Indication (RSSI). The 802.11 tracking often requires more work to set up than GPS, as a site needs to have appropriately dense coverage. More specifically, everywhere a device is to be tracked should be able to see at least 3 access points spaced out in two dimensions relative to the device to be located (i.e., not all in a straight line). In addition, information about signal barriers needs to be obtained. Each can be done during a site survey process, as the same information can be used for determining access point locations and predicted signal coverage.

To prevent unauthorized access to communication system 10, an authentication mechanism may be employed. For example, IEEE 802.1X is part of the IEEE 802.1 group of networking protocols and reflects an IEEE Standard for port-based Network Access Control (PNAC). IEEE 802.1X provides an authentication mechanism to devices wishing to attach to a LAN or WLAN. The 802.1X authentication involves three parties: a supplicant, an authenticator, and an authentication server. The supplicant can be a client device (e.g., location detection device 12) that wishes to attach to a LAN or a WLAN. In one example, the supplicant can be configured to provide credentials to the authenticator. The authenticator can be any network device, such as an Ethernet switch or wireless access point.

The authentication server (e.g., server 20) is typically a host configured to support RADIUS and EAP protocols (e.g., using security module 30). The authenticator acts like a security guard to a protected network. The supplicant is not allowed access through the authenticator to the protected side of the network until the supplicant's identity has been validated and authorized. With 802.1X port-based authentication, the supplicant provides credentials, such as user name and password or a digital certificate, to the authenticator, and the authenticator forwards the credentials to the authentication server for verification. If the authentication server determines the credentials are valid, the supplicant is allowed to access resources located on the protected side of the network.

On detection of a new supplicant, a port on the switch (authenticator) is enabled and set to the "unauthorized" state. In this state, only 802.1X traffic is allowed; other traffic, such as DHCP and HTTP is dropped. To initiate authentication, the authenticator can periodically transmit EAP-Request Identity frames to a special Layer 2 address on the local network segment. The supplicant listens on this address and, on receipt of the EAP-Request Identity frame, responds with an EAP-Response Identity frame containing an identifier for the supplicant such as a User ID. The authenticator then encapsulates this Identity response in a RADIUS Access-Request packet and forwards the response on to the authentication server. The supplicant may also initiate or restart authentication by sending an EAPOL-Start frame to the authenticator, which will then reply with an EAP-Request Identity frame.

The authentication server sends a reply (encapsulated in a RADIUS Access-Challenge packet) to the authenticator, containing an EAP Request specifying the EAP Method (i.e., the type of EAP based authentication it wishes the supplicant to perform). The authenticator encapsulates the EAP Request in an EAPOL frame and transmits it to the supplicant. At this point the supplicant can NAK (negatively acknowledge) the requested EAP Method and respond with the EAP Methods it is willing to perform, or start the requested EAP Method.

If the authentication server and supplicant agree on an EAP Method, EAP Requests and Responses are sent between the supplicant and the authentication server (translated by the authenticator) until the authentication server responds with either an EAP-Success message (encapsulated in a RADIUS Access-Accept packet), or an EAP-Failure message (encapsulated in a RADIUS Access-Reject packet). If authentication is successful, the authenticator sets the port to the "authorized" state and normal traffic is allowed, if it is unsuccessful the port remains in the "unauthorized" state. When the supplicant logs off, it sends an EAPOL-logoff message to the authenticator, the authenticator then sets the port to the "unauthorized" state, once again blocking all non-EAP traffic. Security module 30 in server 20 can be configured to perform the authentication.

In addition to using 802.1X for authentication 802.1x, can also be used to determine the identity of a specific wall socket 14. However, other means of identifying and authentication may be used separately (or in conjunction with 802.1x). For example, communication system 10 may be configured to fill in Citrix ID's and have the Citrix ID's retrievable alongside location data from the network.

In an embodiment, UE 36 may be configured to continuously map their physical location to a switch port such that the fixed port locations for the system will continually be updated by UE 36 (e.g., "Day N" versions such as anytime a UE 36 (e.g., laptop, etc.), is connected to the switch port). [Note that each UE may have both wired and wireless capabilities.] In such an example, switches work in conjunction with a UE or a dongle (handheld device) to configure fixed port locations.

Communication system 10 can also be applied in reverse. For example, when the fixed port location has been pre-configured, the known location of the fixed port can be used as a means to tune, train, test, calibrate, etc. a wireless location system. Communication system 10 applies to both human interfacing end-devices, as well as fully automated end devices (e.g., sensors) that may be dual-homed to a wireless and fixed network.

Turning to the example infrastructure associated with present disclosure, UE 36 can be associated with customer premise equipment, devices, customers, or end users wishing to receive data or content in communication system 10 via some network. The term 'user equipment' is inclusive of devices used to initiate a communication, such as a receiver, a computer, a set-top box, an Internet radio device (IRD), a cell phone, a smart phone, a tablet, a personal digital assistant (PDA), a Google droid, an iPhone, and iPad, or any other device, component, element, or object capable of initiating voice, audio, video, media, or data exchanges within communication system 10. UE 36 may also be inclusive of a suitable interface to the human user, such as a display, a keyboard, a touchpad, a remote control, or other terminal equipment. UE 36 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Network 18 represents a series of points or nodes of interconnected communication paths for receiving and transmitting packets of information that propagate through communication system 10. Network 18 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure could be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and data over cable service interface specification (DOCSIS) cable television (CATV). The architecture of the present disclosure may include a configuration capable of transmission control protocol/internet protocol (TCP/IP) communications for the transmission and/or reception of packets in a network.

Location detection device 12, location anchors 16a-d, and server 20 are network elements that can facilitate the configuration activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, wall outlets, power receiving components, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, location detection device 12, location anchors 16a-d, and server 20 include software to achieve (or to foster) the configuration activities discussed herein. This could include the implementation of instances of fixed port module 22, wireless interface module 24, location module 26, server wireless module 28, and/or security module 30. Additionally, each of these elements can have an internal structure (e.g., a processor, a memory element, etc.) to facilitate some of the operations described herein. In other embodiments, these configuration activities may be executed externally to these elements, or included in some other network element to achieve the intended functionality. Alternatively, location detection device 12, location anchors 16a-d, and server 20 may include software (or reciprocating software) that can coordinate with other network elements in order to achieve the configuration activities described herein. In still other embodiments, one or several devices may include any suitable algorithms, hardware, software, components, modules, interfaces, or objects that facilitate the operations thereof.

Figure 2A:
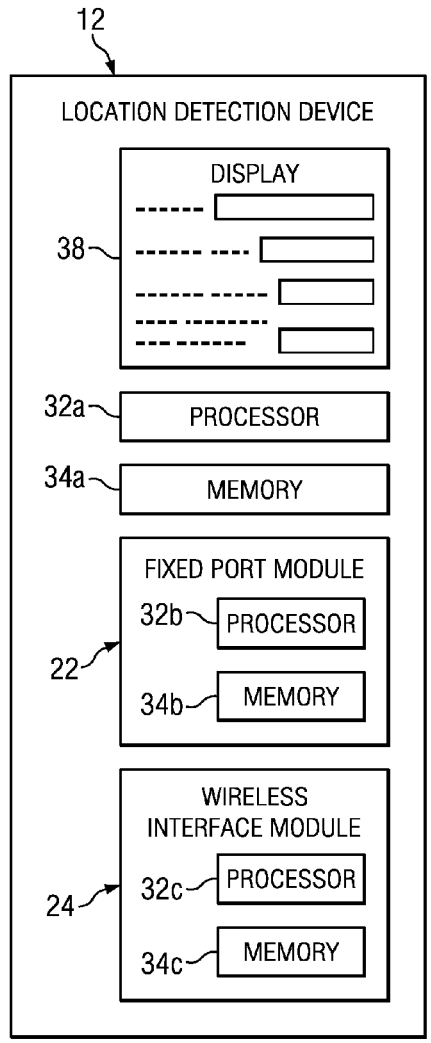
FIG. 2A is a simplified block diagram illustrating possible example details associated with one embodiment of the present disclosure.

Turning to FIG. 2A, FIG. 2A is a simplified block diagram illustrating possible example details associated with one embodiment of location detection device 12. Location detection device 12 includes fixed port module 22, wireless interface module 24, a display 38, a processor 32a, and a memory 34a. Fixed port module 22 includes a processor 32b, and a memory 34b. Wireless interface module includes a processor 32c, and a memory 34c.

Location detection device 12 may be a portable computer (e.g., a laptop computer), a cell phone, a smart phone, a tablet, a PDA, a Google droid, an iPhone, and iPad, or any other portable device, component, element, or object that can facilitate location detection device activities discussed herein. Wireless interface module 24 is configured to wirelessly determine the location of location detection device 12. Fixed port module 22 is configured to be inserted (or connected) to a fixed port location (e.g., wall socket 14) and communicate with a location anchor (e.g., location anchor 16b) that is associated with wall socket 14. Display 38 offers a screen at which fixed port location data can be rendered and presented to an administrator or user.

Figure 2B:
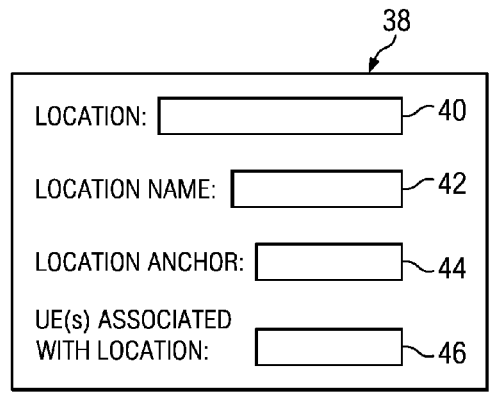
FIG. 2B is a simplified block diagram illustrating possible example details associated with one embodiment of the present disclosure.

Turning to FIG. 2B, FIG. 2B is a simplified block diagram illustrating possible example details associated with one embodiment of display 38. Display 38 can include a location field 40, a location name field 42, a location anchor field 44, and a UE associated with location field 46. Note that as used herein in this Specification, the term 'display' is meant to connote any element that is capable of delivering fixed port location data, text, sound, audiovisual data, etc. to an administrator or an end user. Display 38 can be inclusive of any panel, plasma element, television, monitor, computer interface, surface, screen, or any other suitable element that is capable of delivering/rendering/projecting such information.

In an embodiment, display 38 may contain a graphical user interface (GUI). Using the GUI, the administrator or user can access and modify the configuration of fixed port locations. In one example implementation, the GUI is in direct communication with server 20 and/or the location anchor associated with wall socket location detection device 12 is connected and can obtain the data to be presented on display 38.

Location field 40 can contain the location of location detection device 12 as determined by wireless interface module 24. For example, location field 40 may display the GPS coordinates of location detection device 12. Location name field 42 can contain the name of the location of location detection device 12. For example, the name of the location may be room 42B-1, break room, printer room, security area 51, etc. In an embodiment, an administrator or user of location detection device 12 can edit the information in location field 42. Location anchor field 44 may contain information related to the specific location anchor associated with the wall socket that is connected to location detection device 12.

Figure 3:
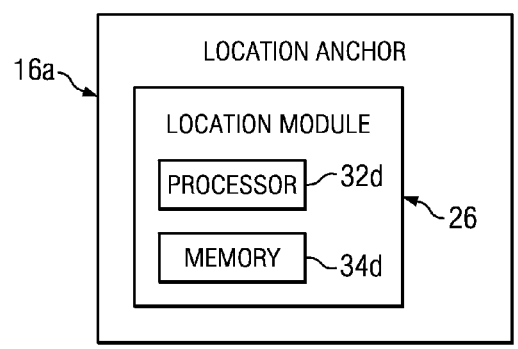
FIG. 3 is a simplified block diagram illustrating possible example details associated with one embodiment of the present disclosure.

Turning to FIG. 3, FIG. 3 is a simplified block diagram illustrating possible example details associated with one embodiment of location anchor 16a. Location anchor 16a includes location module 26. Location module 26 includes a processor 32d, and a memory 34d. Location module 26 can be configured to communicate with fixed port module 22 to provide the information that can be included in location anchor field 44. Location module 26 may also be configured to store information related to wall socket 14 (e.g., location of wall socket 14, any UEs associated with wall socket 14, etc.).

Figure 4:
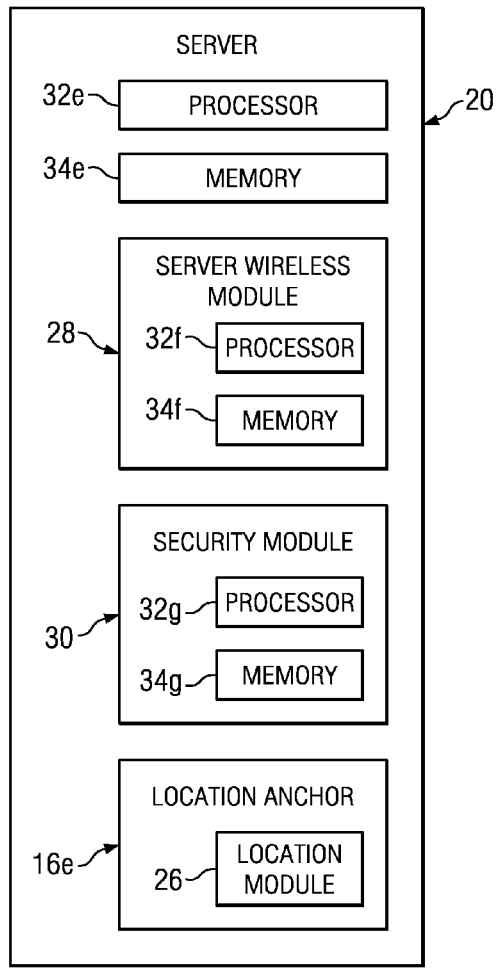
FIG. 4 is a simplified block diagram illustrating possible example details associated with one embodiment of the present disclosure.

Turning to FIG. 4, FIG. 4 is a simplified block diagram illustrating possible example details associated with one embodiment of server 20. Server 20 includes server wireless module 28, security module 30, location anchor 16e, a processor 32e, and a memory 34e. Server wireless module 28 includes a processor 32f, and a memory 34f. Security module 30 includes a processor 32g, and a memory 34g. Location anchor 16e includes location module 26. Security module 30 can be configured to authenticate and verify location detection device 12. Wireless module 28 may be configured to communicate with wireless interface module 24 to send and receive data or information.

Figure 5:
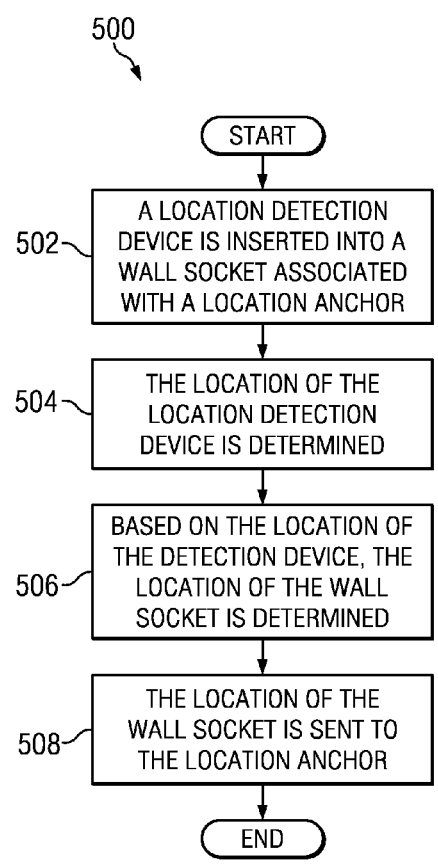
FIG. 5 is a simplified flowchart illustrating potential operations associated with the communication system in accordance with one embodiment of the present disclosure.

Turning to FIG. 5, FIG. 5 is a simplified flowchart 500 illustrating example activities associated with the configuration of fixed port locations. At 502, a location detection device is inserted into a wall socket associated with a location anchor. For example, fixed port module 22 in location detection device 12 may be inserted into (or connected to) a specific wall socket 14 that is associated with location anchor 16b.

At 504, the location of the location detection device can be determined. For example, wireless interface module 24 may use Wi-Fi or GPS to determine the location of location detection device 12. Server wireless module 28 in server 20 may be used (or assist) in determining the location of location detection device 12. At 506, based on the location of the detection device, the location of the wall socket can be determined. At 508, the location of the wall socket is sent to the location anchor. In an embodiment, the location of each specific wall socket 14 may be stored in memory 34e of server 20.

As identified previously, a network element (e.g., location detection device 12, location anchors 16a-d, and server 20, etc.) can include software to achieve the configuration of a fixed port location, as outlined herein in this document. In certain example implementations, the configuration functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor [processors 32a-c shown in FIG. 2A, processor 32d shown in FIG. 3, and processors 32e-g shown in FIG. 4], or other similar machine, etc.). In some of these instances, a memory element [memory 34a-c shown in FIG. 2A, memory 34d shown in FIG. 3, and memory 34e-g shown in FIG. 4] can store data used for the operations described herein. This includes the memory element being able to store instructions (e.g., software, code, etc.) that are executed to carry out the activities described in this Specification. The processor (e.g., processors 32a-g) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in configuring a fixed port location, as outlined herein. Additionally, each of these devices may include a processor that can execute software or an algorithm to perform the fixed port location activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   authenticating a location detection device using a secure communication channel and an agreed upon authentication method, wherein the secure channel and agreed upon authentication method are negotiated between the location detection device and a server;
   determining a location of the location detection device using a wireless link following the authentication;
   determining an identity of a fixed port to which the location detection device is connected,
   wherein the location of the location detection device is proximate to the fixed port;
   determining a location of the fixed port, based on the determined location of the location detection device;
   communicating the location of the fixed port to a location anchor, wherein the location anchor is indirectly connected to the fixed port through a switch;
   linking the location of the fixed port to a point of attachment of the fixed port to the switch in order to configure the fixed port; and
   modifying configuration data associated with the location for the fixed port via the location detection device, wherein the modifying includes modifying a location name associated with the location of the fixed port, modifying location anchor identification information, and modifying one or more user equipment associated with the location of and connected to the fixed port.

2. The method of claim 1, wherein the location of the fixed port is presented to the server for application to the point of attachment via an application program interface (API).

3. The method of claim 1, wherein the determining of the identity of the fixed port is based on a plurality of dynamic host configuration protocol (DHCP) messages.

4. The method of claim 1, wherein the determining of the identity of the fixed port is based on information provided by the location anchor that is proximate to the fixed port.

5. The method of claim 1, wherein the location of the location detection device is determined using a Wi-Fi protocol.

6. The method of claim 1, wherein the location of the location detection device is determined using a global positioning system protocol.

7. The method of claim 1, further comprising:
   inserting an Ethernet port into the fixed port to establish a connection between the location detection device and the location anchor.

8. The method of claim 1, further comprising:
identifying user equipment that is associated with the fixed port by authenticating the user equipment.

9. The method of claim 1, further comprising:
displaying a plurality of locations associated with a plurality of fixed ports.

10. The method of claim 1, further comprising:
determining an identity of the point of attachment to the switch; and
deriving the location of the fixed port based on the identity of the point of attachment to the switch.

11. The method of claim 1, further comprising:
calibrating a wireless location system based, at least in part, on the location of the fixed port, wherein the wireless location system utilizes at least one of:
a Wi-Fi protocol; and
a global positioning system protocol.

12. Logic encoded in non-transitory media that includes instructions for execution and when executed by a processor, is operable to perform operations comprising:
authenticating a location detection device using a secure communication channel and an agreed upon authentication method, wherein the secure channel and agreed upon authentication method are negotiated between the location detection device and a server;
determining a location of the location detection device using a wireless link following the authentication;
determining an identity of a fixed port to which the location detection device is connected,
wherein the location of the location detection device is proximate to the fixed port;
determining a location of the fixed port, based on the determined location of the location detection device;
communicating the location of the fixed port to a location anchor, wherein the location anchor is indirectly connected to the fixed port through a switch;
linking the location of the fixed port to a point of attachment of the fixed port to the switch in order to configure the fixed port; and
modifying configuration data associated with the location for the fixed port via the location detection device, wherein the modifying includes modifying a location name associated with the location of the fixed port, modifying location anchor identification information, and modifying one or more user equipment associated with the location of and connected to the fixed port.

13. The logic of claim 12, wherein the location of the fixed port is presented to the server for application to the point of attachment via an application program interface (API).

14. The logic of claim 12, the operations further comprising:
sending data associated with the location of the fixed port to the server for subsequent storage in a database.

15. The logic of claim 12, wherein the determining of the identity of the fixed port is based on a plurality of dynamic host configuration protocol (DHCP) messages.

16. The logic of claim 12, wherein the determining of the identity of the fixed port is based on information provided by the location anchor that is proximate to the fixed port.

17. The logic of claim 12, the operations further comprising:
determining an identity of the point of attachment to the switch; and
deriving the location of the fixed port based on the identity of the point of attachment to the switch.

18. An apparatus, comprising: a memory element for storing data; a processor that executes instructions associated with the data; and a location module configured to interface with the processor and the memory element such that the apparatus is configured to:
authenticating a location detection device using a secure communication channel and an agreed upon authentication method, wherein the secure channel and agreed upon authentication method are negotiated between the location detection device and a server;
determining a location of the location detection device using a wireless link following the authentication;
determining an identity of a fixed port to which the location detection device is connected,
wherein the location of the location detection device is proximate to the fixed port;
determining a location of the fixed port, based on the determined location of the location detection device;
communicating the location of the fixed port to a location anchor, wherein the location anchor is indirectly connected to the fixed port through a switch;
linking the location of the fixed port to a point of attachment of the fixed port to the switch in order to configure the fixed port; and
modifying configuration data associated with the location for the fixed port via the location detection device, wherein the modifying includes modifying a location name associated with the location of the fixed port, modifying location anchor identification information, and modifying one or more user equipment associated with the location of and connected to the fixed port.

19. The apparatus of claim 18, wherein the location of the fixed port is presented to the server for application to the point of attachment via an application program interface (API).

20. The apparatus of claim 18, wherein the apparatus is further configured to:
determine an identity of the point of attachment to the switch; and
derive the location of the fixed port based on the identity of the point of attachment to the switch.

* * * * *